United States Patent [19]

Thornton, Jr.

[11] Patent Number: 4,824,246
[45] Date of Patent: Apr. 25, 1989

[54] COLORED OBJECT WHICH EXHIBITS IMPROVED CONSTANCY OF COLOR APPEARANCE UPON CHANGE OF ILLUMINANTS AND METHOD

[76] Inventor: William A. Thornton, Jr., 27 Harvard Rd., Cranford, N.J. 07016

[21] Appl. No.: 124,288

[22] Filed: Nov. 23, 1987

[51] Int. Cl.$^4$ .............................................. G01J 1/02
[52] U.S. Cl. .................................................. 356/243
[58] Field of Search ............... 356/402, 243, 256, 421; 350/311

[56] References Cited

U.S. PATENT DOCUMENTS 3,877,797   4/1975   Thornton, Jr. ...................... 350/313

OTHER PUBLICATIONS

Brill et al, "Chromatic Adaptation and Color Constancy: A Possible Dichotomy", *Color Research and Application,* vol. 11, No. 3, Fall 1986, pp. 196–204.
J. Illum. Eng. Soc., 6, pp. 92–99 (1977) "The Design of Safety Colors", W. A. Thornton.
Color Res. & Appl., 10, pp. 73–83 (1985) "Methods for Generating Spectral Reflectance Functions Leading to Color–Constant Properties", Roy S. Berns, Fred W. Billmeyer, Jr., and Richard S. Sacher.

*Primary Examiner*—F. L. Evans

[57] ABSTRACT

Colored object which is to be illuminated by many different types of sources of illumination and which exhibits an improved constancy of color appearance upon change of illuminants. The radiation-absorbing exterior portion of the object has color-absorbing components which combine to exhibit reflectance bands peaking at about 450 nm in the blue-violet, about 530 nm in the green and about 610 nm in the orange-red. The reflectance bands are substantially confined to a radiation range of 50 nm to 60 nm as measured at one-half of the maximum measured reflectance of the bands. This range can be expanded to 40 nm to 80 nm with some sacrifice in performance. The relative proportions of each of the color-absorbing components are preselected to produce a desired composite color for the exterior portion of the object. There is also provided a method for making the exterior portion of the object.

4 Claims, 9 Drawing Sheets

COLORED OBJECT WHICH EXHIBITS IMPROVED CONSTANCY OF COLOR APPEARANCE UPON CHANGE OF ILLUMINANTS AND METHOD

BACKGROUND OF THE INVENTION

This invention relates to colored objects of constant appearance and method and, more particularly, to colored objects and method for coloring same to achieve an improved constancy of color appearance upon changes of illumination.

The colors of clothing, furnishings, food-packaging, safety-colors around dangerous machinery, should all retain their desired color whatever illumination is used. Improvement in color-constancy would be helpful indeed in all walks of life—in clothing, make-up, decorator colors, automobiles, etc. But commercial lamplight is quite liable to distort, change, and even hide the desired colors of these objects whose colors are important in many ways to the human observer.

It has not been known how to design the colors of objects so that the perceived colors of the objects are optimally constant, as illumination is changed. Of course the spectral composition of some illumination, such as sodium lamplight, is such that color distortion cannot be avoided.

Some years ago, the Illuminating Engineering Society was actively concerned with color-constancy of safety-colors, which must reliably indicate both dangerous environments and havens, in both natural and poorly-designed commercial illumination. At that time the present applicant found that, rather than depend on the illuminant for color-constancy, one can redesign the spectral reflectances of the safety-colors; they will then more nearly retain their prescribed hue in poor lamplight. What brought about the improvement was to maximize reflectance at specific wavelengths, namely, wavelengths near 450 nm in the blue-violet, 530 nm in the green, and 610 nm in the orange-red, and to minimize reflectance in the blue-green and yellow. The role of these colors is paramount in various visual phenomena in which chromaticity, or perceived color, of an object needs to be controlled. This work is reported in J. Illum. Eng. Soc., Vol. 6, pgs. 92-99 (1977) article entitled "The Design of Safety Colors" by W. A. Thornton. Other pertinent work is reported in U.S. Pat. No. 3,877,797 issued Apr. 15, 1975 to W. A. Thornton, and in Color Research and Application, Vol. 10, pgs. 73-83 (1985) article entitled "Methods for Generating Spectral Reflectance Functions Leading to Color-constant Properties", by R. S. Berns and F. W. Billmeyer, Jr.

SUMMARY OF THE INVENTION

There is provided a colored object which is to be illuminated by any of many different types of sources of illumination and which exhibits an improved constancy of color appearance upon change of illuminants. The object has a radiation-absorbing surface comprising color-absorbing components combined to exhibit reflectance substantially confined to bands peaking at about 450 nm in the blue-violet, about 530 nm in the green and about 610 nm in the orange-red. These bands also each comprise reflectance in a narrow range of wavelengths of from about 40 nm to about 80 nm, and preferably from about 50 nm to about 60 nm, as measured at one-half of the maximum measured reflectance of the bands. The relative proportions of each of the color-absorbing components are preselected to produce a desired composite color for the object. There is also provided a method for producing such an object.

BRIEF DESCRIPTION OF THE DRAWINGS

For a better understanding of the invention, reference should be made to the accompanying drawings wherein.

DESCRIPTION OF THE PREFERRED EMBODIMENTS

Figure 2:
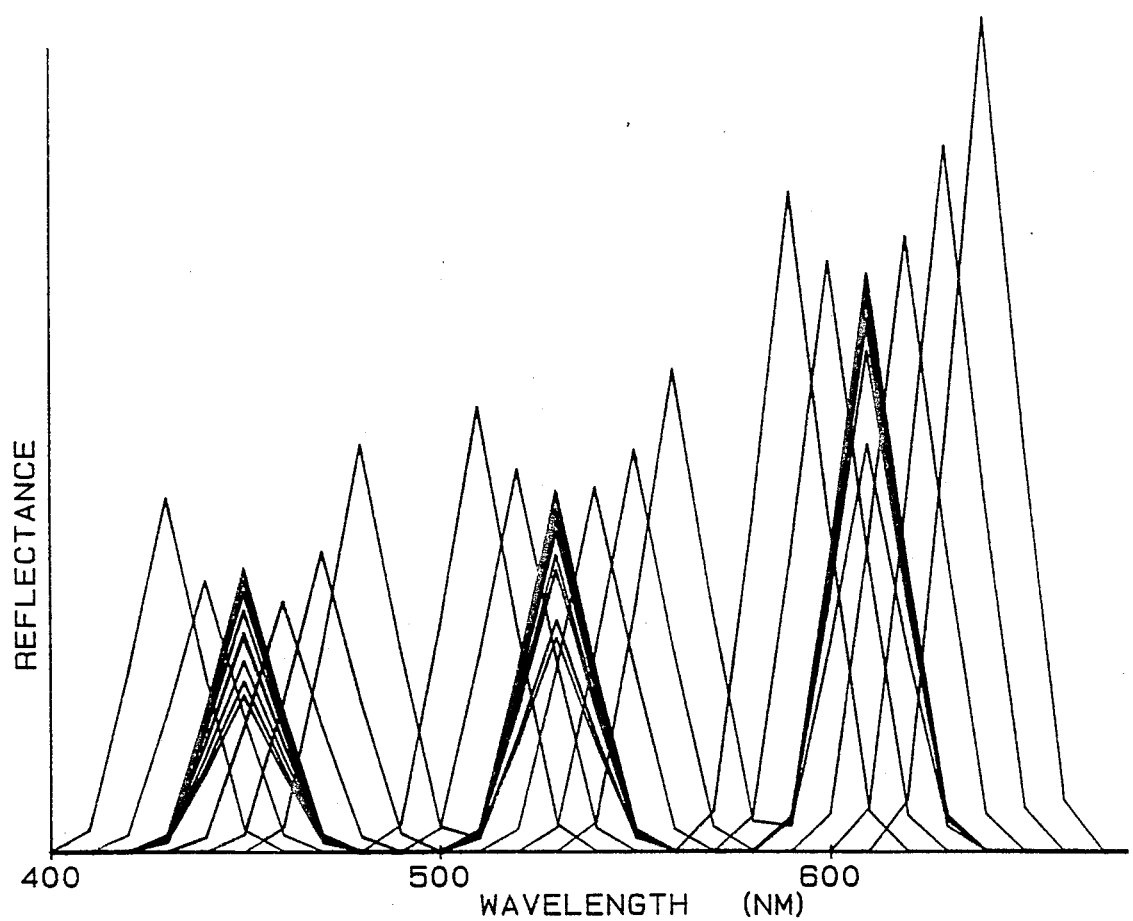
FIG. 2 is a graph of reflectance vs. wavelength for a complete set of eighteen three-peak synthesized reflectances, with a component width of 20 nm, six of which range about each of the selected wavelengths 450 nm, 530 nm, and 610 nm.
Figure 3:
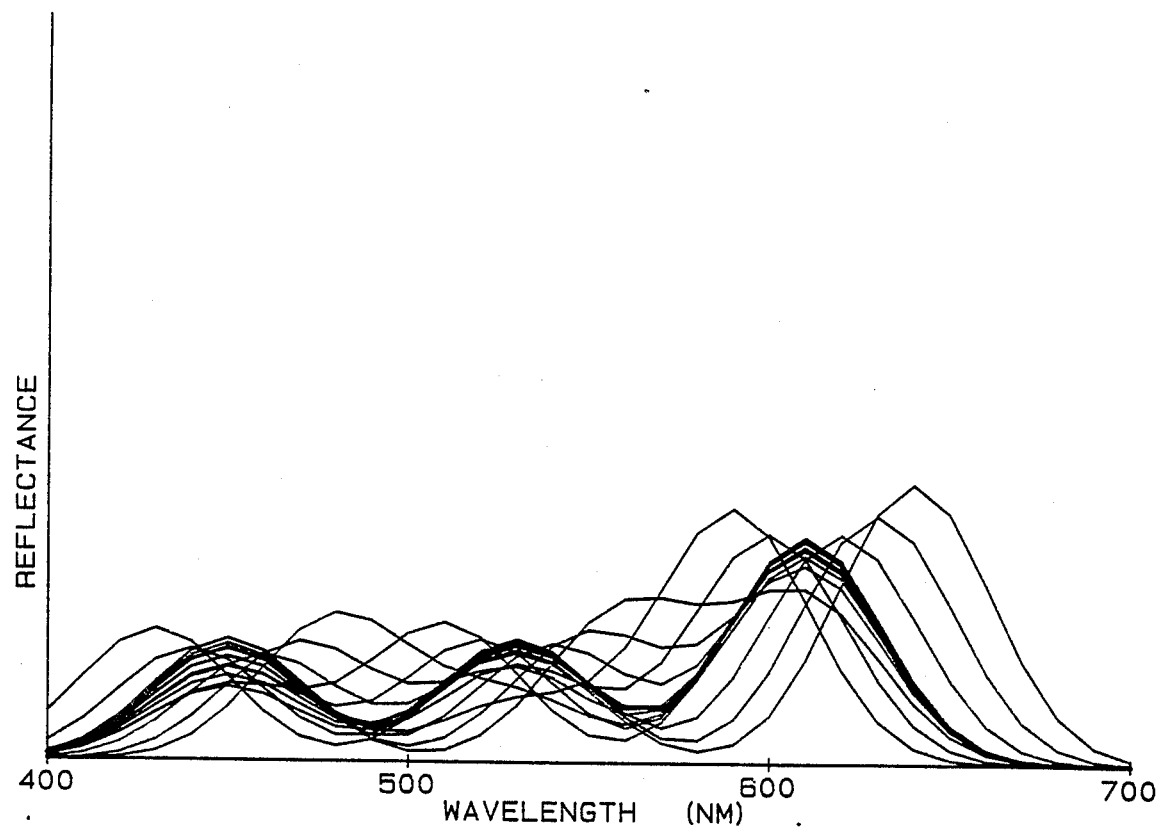
FIG. 3 is a graph of reflectance vs. wavelength for eighteen synthesized reflectances of component-width 50 nm.

As an initial step, three-peaked spectral reflectances were synthesized, each of which is rendered at one of the eight chromaticities at which the eight CIE-Munsell samples are rendered, when all are illuminated by D65 (D65 is "standard daylight", the light from an overcast sky with a color-temperature of 6500K. The eight CIE-Munsell samples are typical object-reflectances of eight different hues, and moderate saturation and lightness, defined in "Method of Measuring and Specifying Colour Rendering Properties of Light Sources", 1st Edition, Publication CIE No. 13 (E-1.3.2) 1965 by Bureau Central de la CIE, 57 Rue Cuvier, Paris 5, France). Each synthesized spectral reflectance comprised three gaussian components, two of which are centered at 450 nm, 530 nm, or 610 nm. The peak of the third reflectance component ranged in wavelength about the remaining color. An 8×12×18 array of peaked reflectances was synthesized: for each of the eight target chromaticities, for each of twelve widths of gaussian reflectance components (10, 20, 30, 40, 50, 60, 70, 80, 90, 100, 120, 140 nm width at half-maximum), a set of eighteen three-peaked spectral reflectances was synthesized, 1728 in all. A partial set of six, ranging about orange-red 610 nm, for reddish CIE-Munsell sample #1 and component-width 30 nm, appears in FIG. 1. As the peak position of the redmost reflectance component changes, the blue-violet and green components adjust themselves in magnitude, of course, so that, when each reflectance is illuminated by D65, the rendered chromaticity will remain at that of the CIE-Munsell sample #1 when it is itself illuminated by D65; namely x=0.3780, y=0.3417. A complete set, for reddish sample #1 and component-width 20 nm, appears in FIG. 2. As will be shown, the narrower reflectance-component-widths (of 20 nm and 30 nm at half-height) do not lead to maximum color-constancy (and presumably would be more difficult to reproduce by the colorists), but are used merely to clarify the method. FIG. 3 is another complete set, for reddish sample #1 and component-width 50 nm. This width is near-optimum for color-constancy, and is more practical from the colorists' point of view.

Each of the 1728 synthesized reflectances was then illuminated (by computer) by each of 43 illuminants, and the resulting 74304 rendered chromaticity-pairs recorded. From the chromaticity of an illuminant itself, and that of each of the 1728 synthesized reflectances as rendered by that illuminant, dominant wavelength and chroma (vector-length in u',v' space) were computed.

RESULTS

DOMINANT WAVELENGTH (PERCEIVED HUE)

Figure 1:
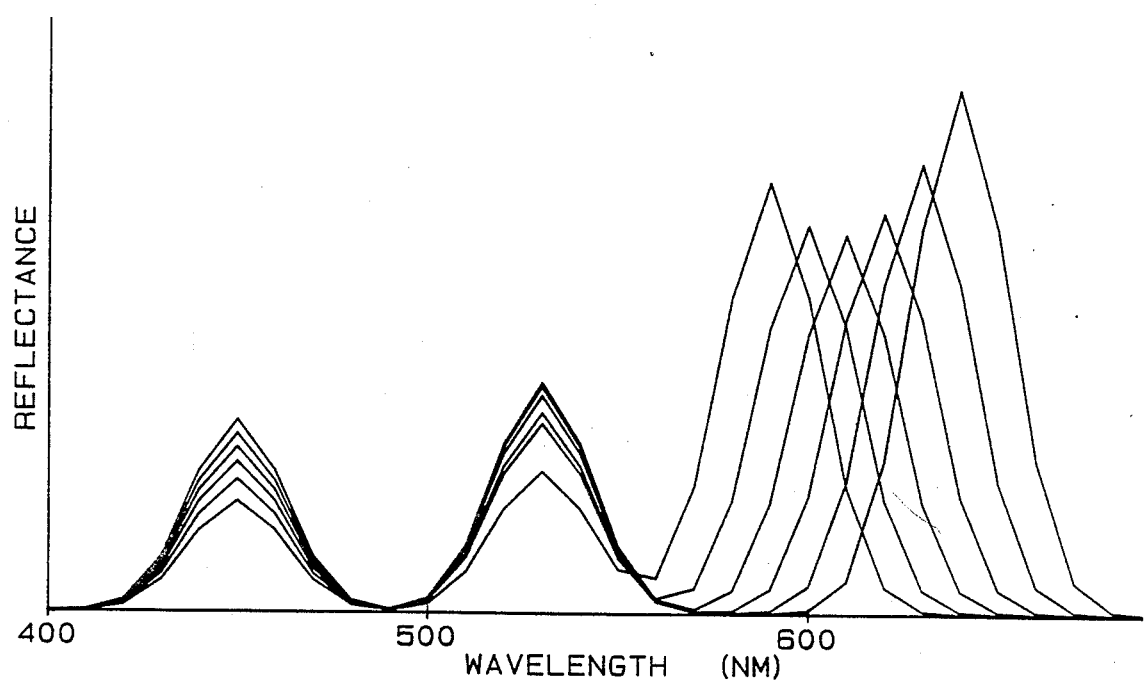
FIG. 1 is a graph of reflectance vs. wavelength for six synthesized spectral reflectances each composed of three gaussian components, one of which is centered at 450 nm, one is centered at 530 nm, and the peak of the third component ranges about 610 nm. Component width is 30 nm at half-maximum.

A typical result is as follows: Total shifts in dominant wavelength, summed over all eight sample reflectances, and over five illuminants (Illuminant A—incandescent lamplight, standard Cool White fluorescent lamplight, standard Warm White fluorescent lamplight, Deluxe Cool White and Deluxe Warm White fluorescent lamplights), are plooted in FIG. 4-A versus the peak wavelength of the variable reflectance—component in the synthesized reflectance. The rightmost curve of FIG. 4-A corresponds to the six reflectances of FIG. 1, except that FIG. 1 represents reflectance-component widths of 30 nm, and FIG. 4-A represents widths of 60 nm. For this group of lamplights, the 60-nm width of reflectance component is optimum; i.e. no other width yields a greater reduction in total shift in dominant wavelength (perceived hue) of the sample. For this group of lamplights, the eight optimum synthesized spectral reflectances should be composed of reflectance components centered at one of the three wavelengths—450 nm, 530 nm, 610 nm—and 60 nm width at half-maximum.

Figure 4:
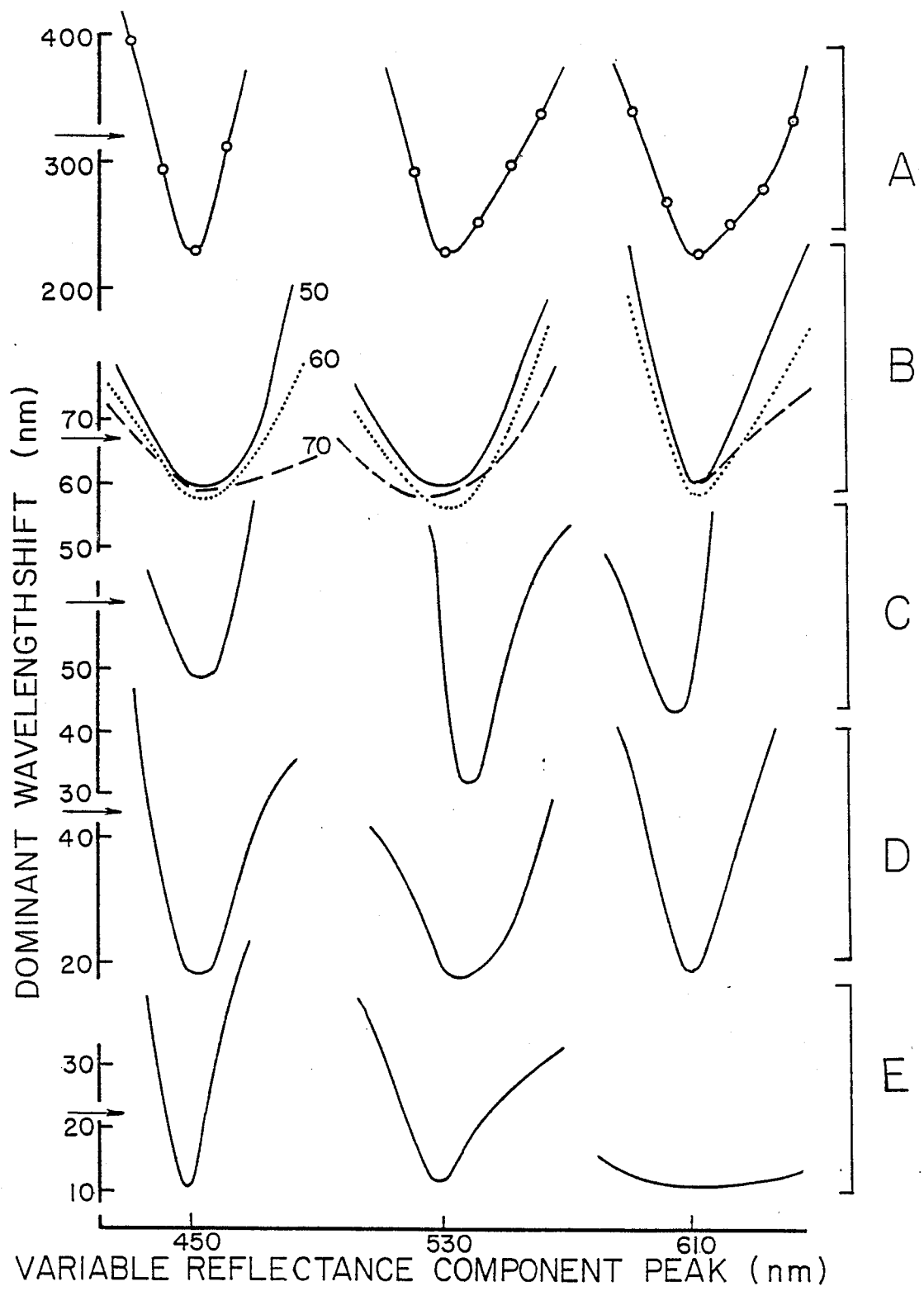
FIG. 4 is a graph of shift in dominant wavelength (perceived hue) vs. peak wavelength of variable reflectance component, for various groups of light sources designated A through E.

This group of lamplights causes a total shift in dominant wavelengths of 320 nm, when the reference CIE-Munsell samples are used, as indicated by the arrow on the ordinate axis of FIG. 4-A. Shifts in dominant wavelength of individual CIE-Munsell samples thus average 320/(8 samples×5 illuminants) or 8 nm, in this example. Total shift is reduced to 230 nm by the optimized peaked reflectances.

FIG. 4, curves A, represents shifts due to five commercial lamplights (Illuminant A—incandescent lamplight, standard Cool White and Warm White fluorescent lamplight, Deluxe Cool White and Deluxe Warm White fluorescent lamplights). Optimum width is 60 nm.

FIG. 4, curves B, represents shifts due to Illuminant A, as it illuminates sets of synthesized sample reflectances of widths 50 nm, 60 nm, and 70 nm; width 60 nm is again optimum. FIG. 4, curves C, represents shifts due to standard Cool White fluorescent lamplight. Here, width 40 nm, and reflectance components at 450 nm, 540 nm (not 530 nm) and 610 nm reduce total shift from 60 nm (for the eight CIE-Munsell samples) to 32 nm. Further optimization could have been done, until all the minima occur at the same level of total shift.

FIG. 4, curves D, represents shifts due to standard Daylight fluorescent lamplight; here, width 50 nm is optimum, and reflectance components at 450 nm, 530 nm, and 610 nm reduce total shift from 44 nm to 19 nm.

Among the 30 commercial lamplights studied, that one yielding the greatest hue-constancy, i.e. rendering the most like D65, is lamplight represented by the Macbeth 50 or General Electric Chroma 50 fluorescent lamps. This lamplight shifts the eight dominant wavelengths of the CIE-Munsell samples only a total of 22 nm. As indicated in FIG. 4, curves E, synthesized reflectances (50 nm width, positioned at 450 nm, 530 nm, and 610 nm) halve the total shift—to only 11 nm in eight samples.

Figure 5:
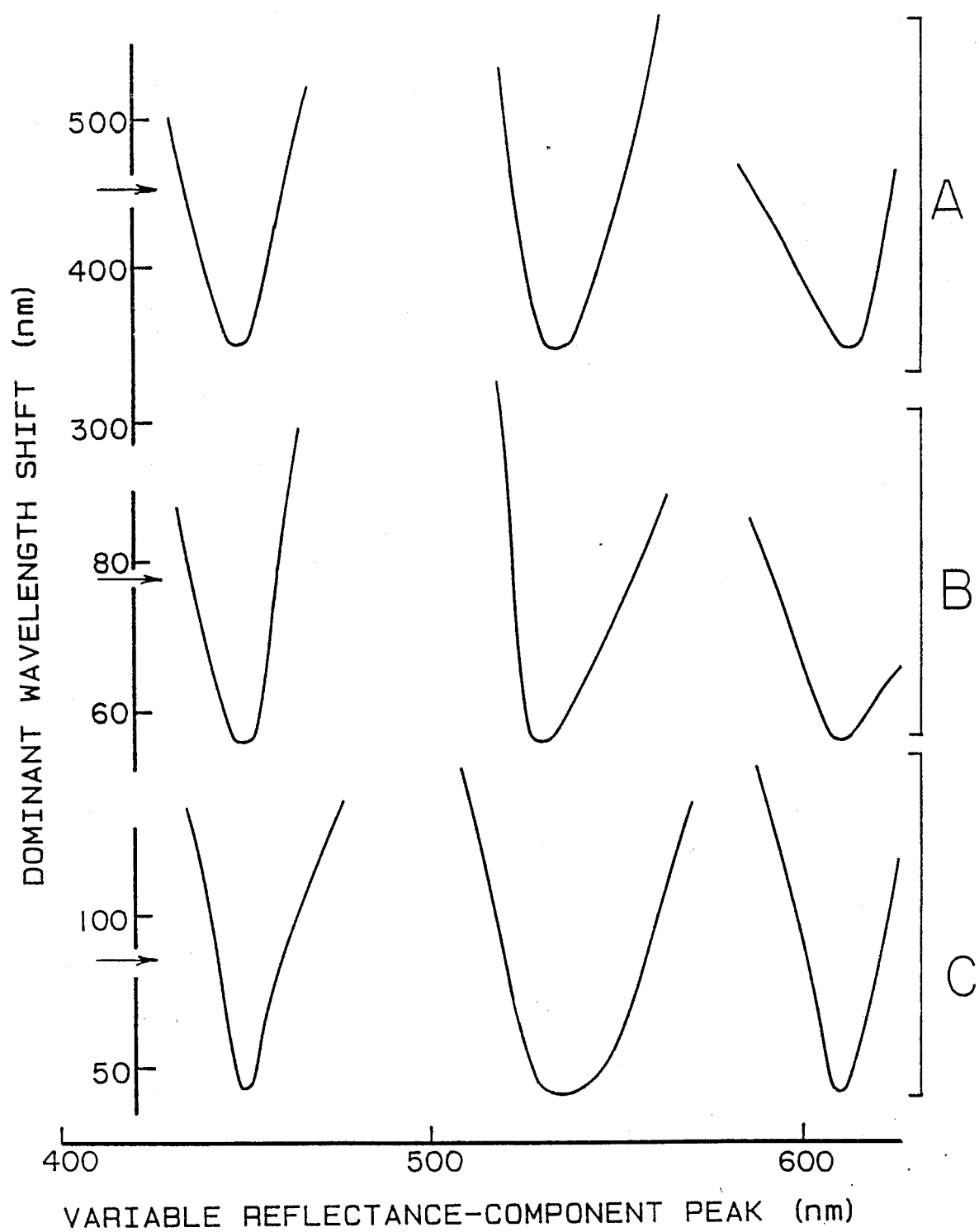
FIG. 5 is similar to FIG. 4 but is illustrated for different commercial high-intensity discharge lamps.

Hue-constancy by commercial high-intensity-discharge (HID) lamlights is quite poor, even relative to that of the standard fluorescent lamplights and to that of Illuminant A. Nevertheless, as shown in FIG. 5, optimum improvement in hue-constancy is effected by the same widths and positioning of reflectance components as with those latter lamplights. FIG. 5, curves A, shows total shifts in dominant wavelength, summed over all eight sample reflectances, and over five HID illuminants (clear mercury-vapor, an old and a newer type (FIG. 5, curves B) of 'deluxe mercury-vapor', metal-halide (sodium-scandium, FIG. 5, curves C), and one of the better high-pressure-sodium lamplights).

Figure 6:
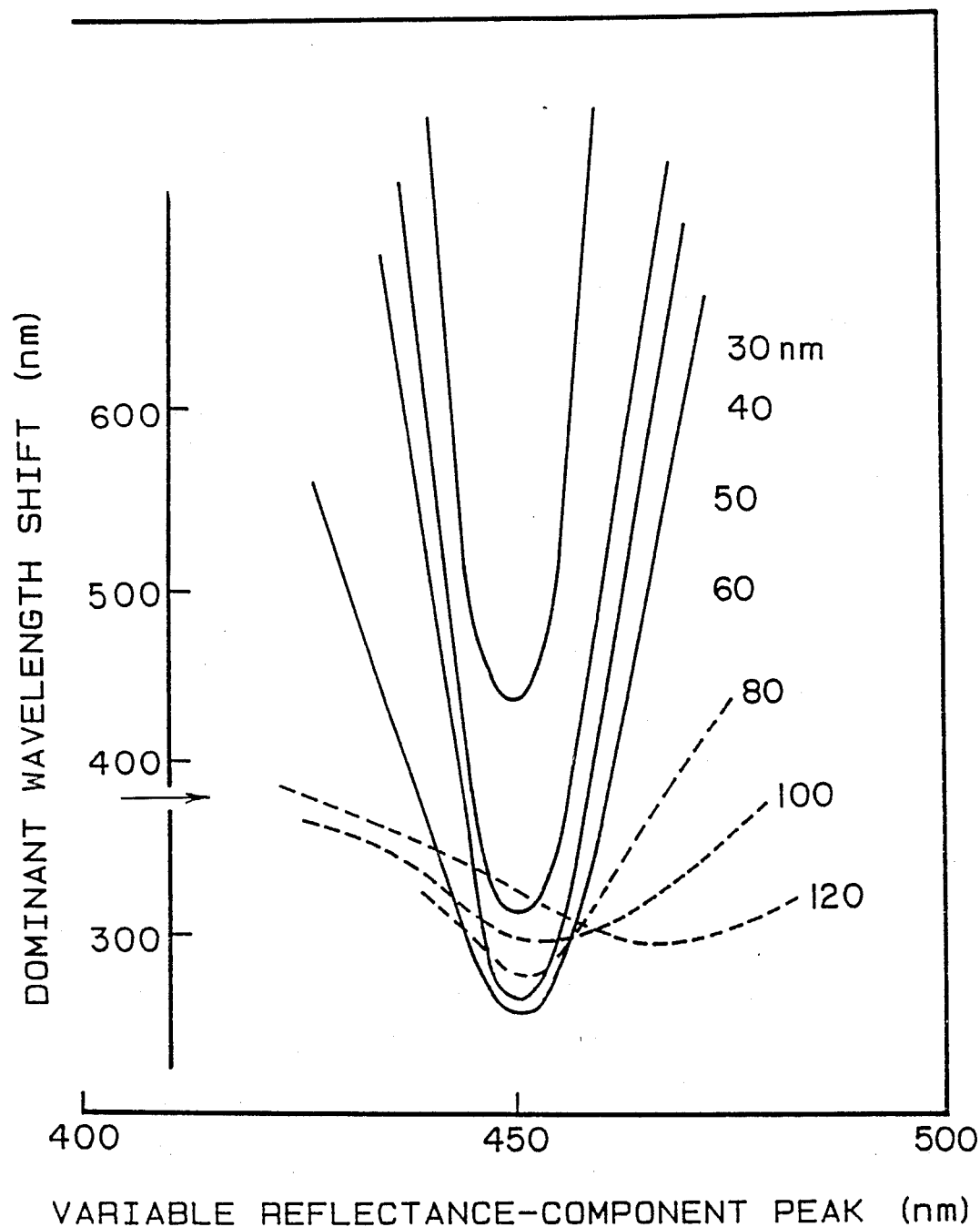
FIG. 6 is a graph of shift in dominant wavelength vs. peak wavelength of variable reflectance-component.

FIG. 6 shows more clearly how total shift of dominant wavelength varies with width of the reflectance components. Here, shifts are summed over nine illuminants and eight samples, and are shown only for peak positions around the blue-violet (450 nm) wavelength. As in other cases described, optimum width is 60 nm. Narrower reflectance components perform less well, and also require more critical positioning. Broader reflectance components also perform less well, but require less critical positioning.

CHROMA (PERCEIVED SATURATION OR COLOR INTENSITY)

Figure 7:
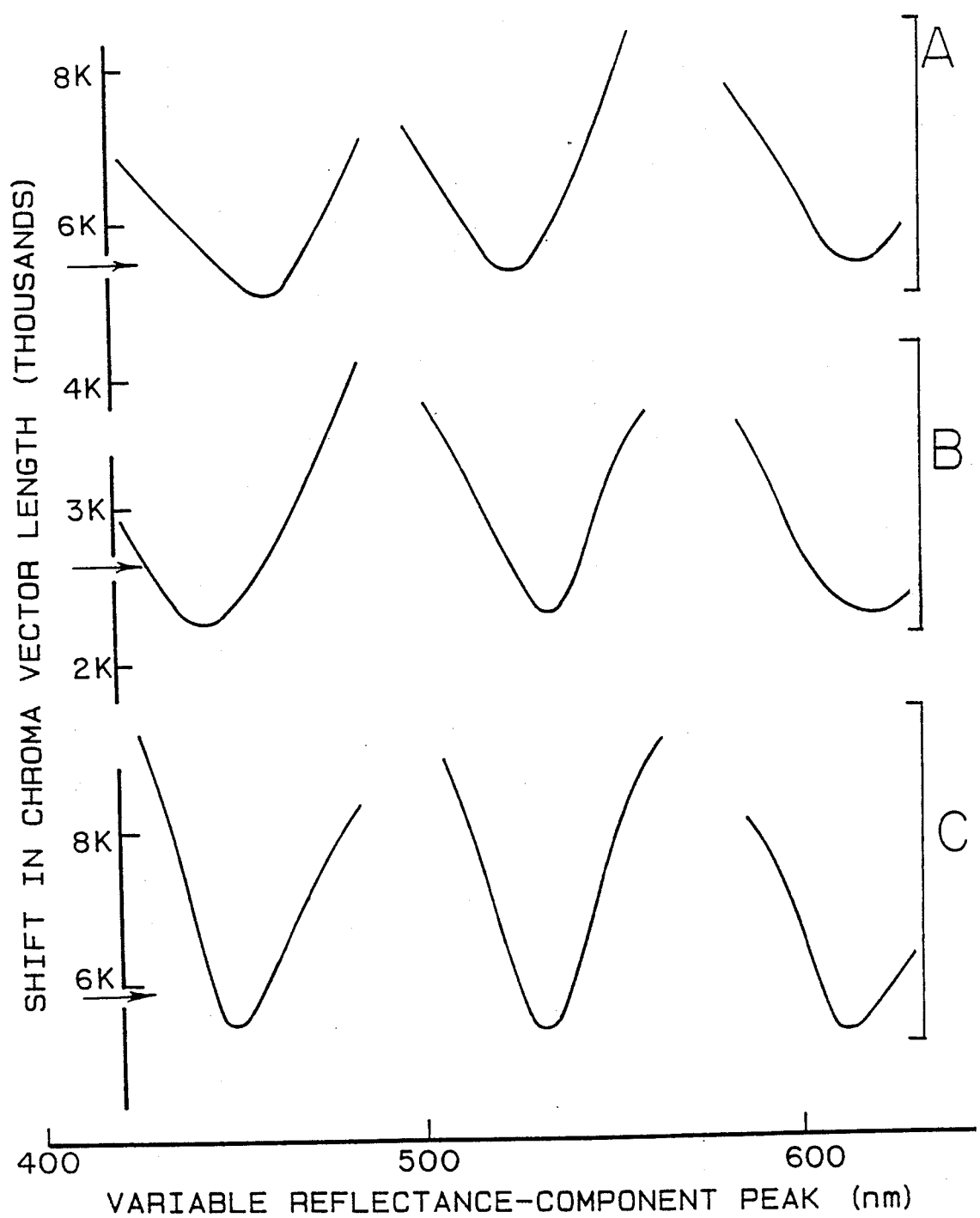
FIG. 7 is a graph of shift in chroma-vector length (perceived saturation, or paleness vs. intensity of color) vs. peak wavelength of variable reflectance-component.

Object-color reflectances with components peaked at the specified wavelength-regions tend to improve chroma-constancy as they do hue-constancy. That is, not only is perceived HUE made more constant, but so also is perceived CHROMA, or intensity of color. However, the effect is not so marked. Three examples of the effect upon chroma, of peaking reflectance at the specified wavelength-regions, are shown in FIG. 7. Again at the optimum width of about 50 nm, the synthesized reflectances slightly improve chroma-constancy by a group of seven 'natural' illuminants ranging in color-temperature from 2000–100,000K (FIG. 7, curves A); for the three most common commercial fluorescent lamplights (FIG. 7, curves B); and for the same group of five HID lamplights (FIG. 7, curves C) previously reported in FIG. 5, curves A. Under a group of three 'deluxe' fluorescent lamplights (Cool White Deluxe, Macbeth 75 and Macbeth 50), the correct synthetic reflectances merely equalled the reference reflectances in chroma-constancy. For a group of seven 'tri-phosphor' fluorescent lamplights, by four manufacturers, no peaked reflectance even equalled the reference reflectances at holding chroma constant. The reason for this is simply that the tri-phosphor fluorescent lamplights, themselves, sample any object-reflectance at the specified wavelength regions.

DISCUSSION

In summary, a particular set of eight CIE-Munsell sample reflectances was chosen to serve as reference. Each of 1728 synthesized reflectances is rendered by illuminant D65 at the chromaticity at which one of the 10 CIE-Munsell samples is rendered by D65. The chromaticities, at which each of the 1728 synthesized reflectances is rendered by each of 43 different illuminants, define both dominant wavelength (perceived hue) and chroma-vector (perceived chroma, or intensity of color) for the resulting 74,304 illuminant-sample combinations. Table I shows average hue-shift and chroma-shift, per sample, by the eight CIE-Munsell test-colors, and by that set of peaked synthetic reflectances which minimizes hue-shift and chroma-shift, under several classes of lamplights.

So far as the eight CIE-Munsell samples are typical, the following conclusions may be drawn:

1. For most cases of natural illuminants or present commercial lamplights, color-constancy is maximized by synthesizing each sample reflectance of three components, peaking at the specified wavelengths (i.e., near 450 nm, 530 nm, and 610 nm).

2. In this work, reflectance-components of gaussian shape were used; width at half-maximum of 50-60 nm yields minimum hue-shift and chroma-shift (i.e., maximum color-constancy) under most illuminants of interest.

3. Residual hue-shift and chroma-shift is usually considerable, often not smaller than 50%.

4. No shaping of spectral reflectance of object-colors can be expected to result in more favorable reduction of hue-shift or chroma-shift, at least insofar as hue is characterized by dominant wavelength and saturation is characterized by chroma-vectors in u',v' space. That is, the teachings of this present method lead to color-constancy that cannot be surpassed by any further change of object-reflectance.

5. Under deluxe fluorescent lamplights, hue-shift is thus reduced to the very small value of 1.9 nm per sample, averaged over eight samples and five lamplights. Under standard fluorescent lamplights, hue-shift is halved.

6. Nothing deemed useful can be done for color-constancy under standard high-pressure and low-pressure sodium lamplights. Some advantage can be gained, in severely limited applications, by using fluorescent samples. As 'deluxe' high-pressure-sodium lamplight improves in color-rendering, it becomes more possible to design reflectance with improved color-constancy; in the example in Table I, average hue-shift per sample was reduced from about 12 nm to about 9 nm, and as sodium pressure increases greater reductions are possible.

Figure 8:
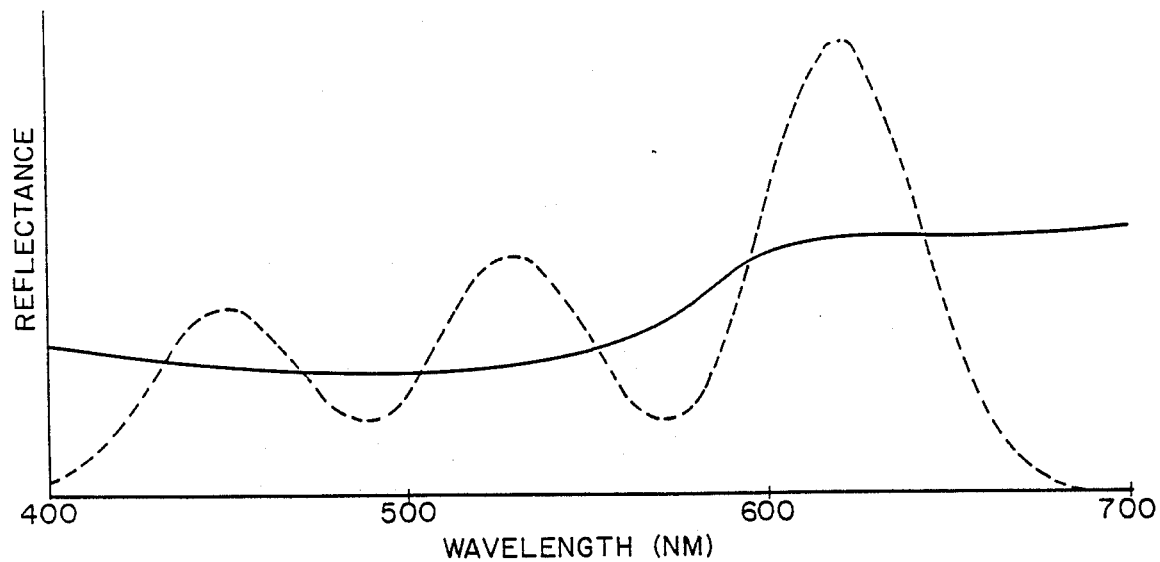
FIG. 8 is a graph of reflectance vs. wavelength for actual CIE-Munsell test-color No. 1, and for an object with optimized reflectance.

In FIG. 8, the CIE-Munsell reflectance for sample #1 is shown (solid curve), together with that of the optimum specified peaked reflectance (dashed curve). The solid curve is typical of "natural" reflectances; the dashed curve is typical of the synthesized reflectances of the present invention, with their much improved color-constancy when the illumination is changed.

In the following Table I are given average hue-shift and chroma-shift, per sample, by the eight (natural) CIE-Munsell test-colors, and by optimized three-peaked synthetic reflectances, under several classes of lamplights; also given are optimum positions and widths of reflectance-components.

TABLE I

| Lamplight Class | No. of Lamplights in group | Average Hue-shift per sample (nm) | | Average Chroma-shift per sample (10000 × du 'v') | | Optimum Peak Wavelength of reflect. component | | | Optimum Width | e.g. see FIGS. |
| --- | --- | --- | --- | --- | --- | --- | --- | --- | --- | --- |
| | | CIE | Peaked | CIE | Peaked | Short | Middle | Long | | |
| Deluxe fluorescent | 5 | 2.9 | 1.9 | 40 | 40 | 450 | 530 | 610 | 50-60 | 4 and 6 |
| 'Natural illuminants' | 8 | 4.3 | 3.7 | 100 | 90 | 450 | 530 | 610 | 60-100 | 4 and 7 |
| 'Tri-phosphor' fluor. | 7 | 6.4 | 4.6 | 100 | 100 | 440 | 540 | 600 | 100 | — |
| Standard fluorescent | 3 | 8.0 | 4.2 | 110 | 90 | 450 | 530 | 610 | 50 | 4, 6 and 7 |
| 'Illuminant A' | 1 | 8.4 | 7.0 | 160 | 150 | 450 | 530 | 610 | 60 | 4 and 7 |
| High-intensity-disch. | 5 | 10.6 | 8.0 | 130 | 120 | 450 | 530 | 610 | 60 | 5 and 7 |
| High-pressure-sodium | 1 | 15 | — | 350 | — | 460 | 520 | 620 | 80 | — |
| Low-pressure-sodium | 1 | 25 | — | 500 | — | — | — | — | — | — |

APPLICATION

All colored objects, whether the coloration is natural or manmade, possess their color by reason of specific absorption of parts of the illumination incident on them. An object that reflects all wavelengths of incident light perfectly is 'perfectly white'. Generally speaking, the object appears white whatever the spectral composition of the illumination, if the illumination color and its spectral composition fall within broad, normal, usual limits. To be 'white', it is necessary and sufficient that the object reflect essentially all of the light of every visible wavelength that falls upon it. In FIG. 8, the solid curve is the spectral reflectance of a typical natural or manmade colored object; the object of FIG. 8 is reddish, when perceived in normal illumination.

If we define the 'true' color of an object as that color perceived when the object is illuminated by average daylight (called D65, and approximated by the light from an overcast sky), then one finds that many commercial lamplights, and even the light of some sunsets and sunrises, for example, distort the perceived colors until in some cases the observer cannot recognize the object.

The two (reddish) objects whose reflectances appear in FIG. 8 have exactly the same perceived color in average daylight (D65). However, the dashed curve of FIG. 8 is the best possible altered reflectance if color-constancy under a large range of different illuminations, including most commercial lamplights, is desired. This was determined by optimizing the reflectance under 43 different illuminations, which included phases of daylight and commercial lamplights.

For best color-constancy, the ideal spectral reflectance, for objects of any color whatever, consists of three reflectance peaks centered near 450 nm in the blue-violet, near 530 nm in the green, and near 610 nm in the orange-red parts of the visible spectrum, according to the dashed curve of FIG. 8. If a different color is desired, it is only necessary to vary the relative heights of the three reflectance peaks (but not their positions in wavelength, nor their widths). For example, if a green object-color is desired, rather than the reddish color of the peaked reflectance of FIG. 8, then the green reflectance peak centered near 530 nm must be heightened, and the red reflectance peak near 610 nm must be reduced in height.

The desired spectral reflectance is always achieved, in any human coloring operation, by introducing materials on or in the object that absorb selected bands of the incident visible light. The residue—that part of the incident visible light that is reflected—is the light that enters the observer's eye and governs his perception of the color of the object.

Therefore, for object coloration having the best color-constancy, four absorption bands must be introduced (four dyes, or four pigments, is a number in common use among colorists). These absorption bands must be centered on the unwanted reflection bands, that is, on the desired gaps between the three optimized (desired) reflectance peaks. The wavelength regions at which absorption should be introduced are: (Violet,V) 420 nm and shorter; (blue-green,BG) the region around 490 nm; (yellow,Y) the region around 580 nm; and deep-red, DR) 660 nm and longer (see FIG. 8). These absorption bands mark the dips in the dashed curve of FIG. 8.

Materials suitable for dyes and pigments absorbing in the violet are numerous, even in view of the desirability of a sharp cutoff in its absorption in the neighborhood of 410–420 nm. Examples are: calcium aluminate, rutile, strontium titanate, and the organic materials used in plastic screens in shop windows to guard against fading by the sun. Any one or combination of these may be used to introduce the desired violet absorption.

An example of a narrow-band, blue-green-absorbing material is platinum tetraphenylporphyrin chelate. This material may be used to introduce the desired blue-green absorption.

Examples of narrow-band, yellow-absorbing materials are any of the didymium (or neodymium or praseodymium)-containing glass-like materials (such as Corning material 1–60, or Fish-Schurman materials BG-20 and BG-36) which may be pulverized and used as pigments. Any of these may be used to introduce tha desired yellow absorption.

An example of a material absorbing in the deep-red is Fish-Schurman material HA11, which may be used to introduce the desired deep-red absorption.

EXAMPLE OF MATERIAL

A specific example of a material fabricated in accordance with the present invention is as follows. Suppose we wish to reproduce the dashed, three-peaked reflectance curve of FIG. 8 in an automobile body paint. The result would be an actual material that will be perceived to have that particular reddish color. Furthermore, the color of the material will remain optimally constant under many illuminants and lamplights; automobiles find themselves under perhaps a greater variety of differing illuminations than many other artificially-colored objects, it being sometimes difficult to identify one's automobile in the poor illumination of parking lots, for example.

First consider both the 'natural' object represented by the solid spectral reflectance curve of FIG. 8, and the synthetic object represented by the optimized, dashed, three-peaked spectral reflectance curve of FIG. 8. The percent reflectance of these two objects, at the critical wavelengths, is given in the following Table:

|  | V | B-V | B-G | G | Y | O-R | D-R |
| --- | --- | --- | --- | --- | --- | --- | --- |
| Wavelength (nm) | 400 | 450 | 490 | 530 | 580 | 610 | 660 |
| Natural Object | 25% | 22% | 22% | 23% | 34% | 44% | 45% |
| Synthetic Object | 3% | 32% | 12% | 42% | 12% | 78% | 15% |

We wish to make a paint that can be applied to many types of objects in order to make them take on the desired reddish color in any illumination. What is necessary is to choose a conventional vehicle, such as a lacquer base; a conventional whitener, such as titania; and then add didymium pigment until the reflectance in the yellow at 580 nm decreases to 12%; add the blue-green-absorbing chelate until reflectance in the blue-green at 490 nm decreases to 12%; add the Fish-Schurman deep-red absorber until reflectance at 660 nm decreases to 15%; and finally check the reflectance at 400 nm to be sure that the titania itself has reduced violet reflectance to a few percent. The four absorbing materials interact somewhat, of course, making it necessary to readjust the four-way ratio of additives until the desired color is achieved, under some of appropriate daylight-like test-illumination. If a blue paint is desired, a higher proportion of the deep-red-absorbing and of the yellow-absorbing materials is necessary, and less of the violet-absorbing and blue-green-absorbing materials.

Figure 9:
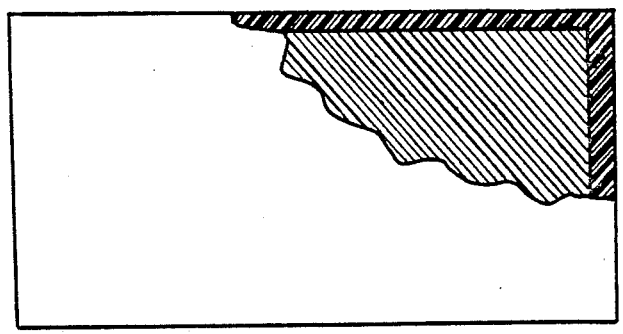
FIG. 9 is an elevational view, partly in section, illustrating an object which carries a coating of the present invention.

In FIG. 9 is shown a coated article or object 10 which carries thereon a coating layer 12 which is fabricated in accordance with the present invention.

While the preferred narrow range of widths to which the peak-reflectances are confined substantially is from about 50 nm to about 60 nm, this range can be expanded to 40 nm to 80 nm without appreciably affecting the performance of the material. The coating can be applied as a single layer, as shown in FIG. 9, or it could be applied in multiple layers. Alternatively, the entire object could be impregnated with the absorbing materials, if desired, as in the case of extruded plastic bodies. The absorbing materials can be introduced into or onto yarn or fabric, either natural or synthetic, or can be introduced into dyes or inks. Whatever the intended color of the object, or the materials of which the object is made, the three-peaked nature of the object-reflectance curve, as the dashed curve of FIG. 8, is characteristic of the present invention.

I claim:

1. A colored object which is to be illuminated by any of many different types of sources of illumination and which exhibits an improved constancy of color appearance upon change of illuminants, the exterior portion of said colored object which provides the color appearance for said colored object comprising:

color-absorbing components combined to exhibit reflectance substantially confined to bands peaking at about 450 nm in the blue-violet, about 530 nm in the green and about 610 nm in the orange-red, and said reflectance bands each comprising a narrow range of radiations substantially confined to a radiation range of from about 40 nm to about 80 nm as measured at one-half of the maximum measured reflectance of said bands; and the relative proportions of each of said color-absorbing components being preselected to produce a desired composite color for said exterior portion of said object.

2. The colored object as specified in claim 1, wherein said reflectance bands each comprise a narrow range of radiations confined to a radiation range of from about 50 nm to about 60 nm as measured at one-half of the maximum measured reflectance of said bands.

3. The method of improving the constancy of color appearance of a colored object which is to be illuminated by any of many different types of illumination, which method comprises:

selecting the principal color-absorbing components to be used to color said object to display reflectance substantially confined to bands which peak at about 450 nm in the blue-violet, about 530 nm in the green and about 610 nm in the orange-red, with said reflectance bands each comprising a narrow range of radiations substantially confined to a radiation range of about 40 nm to about 80 nm as measured at one-half of the maximum measured reflectance of said bands;

preselecting the relative proportions of each of said color-absorbing components to produce a desired composite color for said object to be colored; and applying said color-absorbing components in said preselected proportions to said object to color same.

4. The method as specified in claim 3, wherein said reflectance bands each comprise a narrow range of radiations confined to a radiation range of from about 50 nm to about 60 nm as measured at one-half of the maximum measured reflectance of said bands.

* * * * *